(12) United States Patent
Choi et al.

(10) Patent No.: US 11,412,837 B2
(45) Date of Patent: Aug. 16, 2022

(54) AMBIDEXTROUS MOUNT FOR A DATA CAPTURE DEVICE

(71) Applicant: ZEBRA TECHNOLOGIES CORPORATION, Lincolnshire, IL (US)

(72) Inventors: JaeHo Choi, Whitestone, NY (US); Sunghun Lim, Bethpage, NY (US); Jin Namkung, Washington, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/696,517

(22) Filed: Nov. 26, 2019

(65) Prior Publication Data

US 2021/0153631 A1    May 27, 2021

(51) Int. Cl.
*A45F 5/00* (2006.01)
*G06K 7/14* (2006.01)
*G06K 7/10* (2006.01)

(52) U.S. Cl.
CPC ............ *A45F 5/00* (2013.01); *G06K 7/10366* (2013.01); *G06K 7/1413* (2013.01); *A45F 2005/008* (2013.01); *A45F 2200/0516* (2013.01); *G06K 2007/10534* (2013.01)

(58) Field of Classification Search
CPC ........ A45F 2005/008; A45F 2200/0516; A45F 2200/0525; G06K 7/10891; G06K 2007/10534
See application file for complete search history.

(56) References Cited

U.S. PATENT DOCUMENTS

| 5,257,708 | A | * | 11/1993 | Dubach | B65D 47/0814 |
| | | | | | 215/235 |
| 5,309,328 | A | * | 5/1994 | Lum | A45F 5/00 |
| | | | | | 2/170 |
| 5,435,456 | A | * | 7/1995 | Dubach | B65D 47/0814 |
| | | | | | 215/235 |
| 5,587,577 | A | * | 12/1996 | Schultz | G06K 7/10881 |
| | | | | | 235/462.44 |
| 5,837,990 | A | * | 11/1998 | Shepard | G06K 7/10891 |
| | | | | | 235/383 |
| 5,924,136 | A | * | 7/1999 | Ogean | A45C 1/04 |
| | | | | | 2/159 |

(Continued)

FOREIGN PATENT DOCUMENTS

CN    108718202 A    10/2018

OTHER PUBLICATIONS

International Search Report and Written Opinion for International Application No. PCT/US2020/051914 dated Dec. 18, 2020.

*Primary Examiner* — Justin M Larson (57) ABSTRACT

An ambidextrous hand mount for an electronic device comprises: a proximal fastener configured to engage with a wrist of an operator; a distal fastener configured to engage with a finger of the operator; a body connecting the proximal fastener and the distal fastener and configured to extend along a back of a hand of the operator from the wrist to the finger; wherein the body includes: a main segment configured to support the electronic device; and a flexible segment between the main segment and the proximal fastener, the flexible segment configured to deform to accommodate changes in an angle between the body and the proximal fastener.

23 Claims, 5 Drawing Sheets

(56) References Cited

U.S. PATENT DOCUMENTS

| | | | | |
|---|---|---|---|---|
| 6,010,071 | A * | 1/2000 | Bard | G06F 1/163 |
| | | | | 235/462.43 |
| 6,015,090 | A * | 1/2000 | Swartz | G06K 7/10861 |
| | | | | 235/472.01 |
| 7,331,817 | B1 | 2/2008 | Morris et al. | |
| 7,334,711 | B1 * | 2/2008 | Winters | A45F 5/00 |
| | | | | 224/217 |
| 7,432,629 | B2 * | 10/2008 | Mala | G02B 6/3584 |
| | | | | 310/309 |
| 7,942,326 | B2 * | 5/2011 | Miller | G06K 7/10386 |
| | | | | 235/440 |
| 8,196,787 | B2 * | 6/2012 | Strandberg | A45F 3/14 |
| | | | | 224/217 |
| 8,235,294 | B2 * | 8/2012 | Miller | G06K 7/0004 |
| | | | | 235/472.02 |
| 8,256,369 | B2 * | 9/2012 | Karow | E01F 13/02 |
| | | | | 116/63 P |
| 8,260,384 | B2 * | 9/2012 | Wulff | A45F 5/00 |
| | | | | 455/575.6 |
| 8,317,102 | B2 * | 11/2012 | Miller | G06Q 10/087 |
| | | | | 235/439 |
| D763,568 | S * | 8/2016 | Singhal | D3/218 |
| 9,464,755 | B1 * | 10/2016 | Inman | A45F 5/00 |
| 9,554,639 | B1 * | 1/2017 | Harden | G03B 17/561 |
| 9,693,622 | B1 * | 7/2017 | Hackett | H04B 1/385 |
| 9,743,731 | B2 * | 8/2017 | Oberpriller | A45F 5/00 |
| D822,028 | S * | 7/2018 | Hackett | D14/432 |
| D832,844 | S * | 11/2018 | Lim | D14/427 |
| D833,438 | S * | 11/2018 | Lim | D14/427 |
| 10,136,715 | B2 * | 11/2018 | Oberpriller | A45F 5/021 |
| 10,245,492 | B1 | 4/2019 | Bellairs | |
| D859,405 | S * | 9/2019 | Hackett | D14/372 |
| 10,433,623 | B2 * | 10/2019 | Trahern | H04B 1/385 |
| 10,528,780 | B2 * | 1/2020 | Lim | G06F 1/163 |
| 10,617,198 | B1 * | 4/2020 | De Michele | A45F 5/00 |
| 10,789,436 | B1 * | 9/2020 | Lim | G06K 7/10891 |
| 10,817,689 | B2 * | 10/2020 | Mazzone | G06K 7/10772 |
| 10,839,183 | B2 * | 11/2020 | Sakamoto | G06K 7/1404 |
| 2005/0258205 | A1 * | 11/2005 | French | A45F 3/12 |
| | | | | 224/264 |
| 2007/0201861 | A1 * | 8/2007 | Coulman | A45F 5/00 |
| | | | | 396/420 |
| 2008/0078838 | A1 * | 4/2008 | Morris | G06K 7/10891 |
| | | | | 235/462.44 |
| 2008/0296139 | A1 * | 12/2008 | Morris | G06K 7/10881 |
| | | | | 200/502 |
| 2009/0032560 | A1 | 2/2009 | Strandberg et al. | |
| 2009/0247299 | A1 * | 10/2009 | Conticello | G06F 3/014 |
| | | | | 463/37 |
| 2009/0266898 | A1 * | 10/2009 | Miller | G06K 7/10584 |
| | | | | 235/472.01 |
| 2011/0269334 | A1 | 11/2011 | Hsieh et al. | |
| 2013/0240578 | A1 * | 9/2013 | Yu | H04B 1/385 |
| | | | | 224/197 |
| 2013/0240580 | A1 * | 9/2013 | Yu | A45F 5/00 |
| | | | | 224/217 |
| 2016/0179368 | A1 * | 6/2016 | Roeder | G06F 3/04886 |
| | | | | 715/740 |
| 2017/0170855 | A1 * | 6/2017 | Wilkins, Jr. | A45F 5/00 |
| 2018/0000212 | A1 | 1/2018 | Oberpriller et al. | |
| 2019/0196535 | A1 * | 6/2019 | Paufler | G06F 3/0346 |
| 2019/0197273 | A1 * | 6/2019 | Mazzone | G06K 7/1417 |
| 2020/0134275 | A1 * | 4/2020 | Sakamoto | G06K 7/10722 |
| 2020/0237032 | A1 * | 7/2020 | Berlips | A41D 19/0024 |
| 2020/0305522 | A1 * | 10/2020 | Ruhland | G06K 7/10891 |
| 2021/0027031 | A1 * | 1/2021 | Lim | G06F 1/163 |
| 2021/0033472 | A1 * | 2/2021 | Turner | G01K 13/20 |

\* cited by examiner

AMBIDEXTROUS MOUNT FOR A DATA CAPTURE DEVICE

BACKGROUND

Finger or hand-mounted electronic devices, such as data capture devices, can be used to capture barcodes and the like, e.g. for transmission to a computing device carried by the operator. Mounting devices to attach such electronic devices to an operator's hand, however, may not be suitable for all operators.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an ambidextrous hand mount for an electronic device, comprising: a proximal fastener configured to engage with a wrist of an operator; a distal fastener configured to engage with a finger of the operator; a body connecting the proximal fastener and the distal fastener and configured to extend along a back of a hand of the operator from the wrist to the finger; wherein the body includes: a main segment configured to support the electronic device; and a flexible segment between the main segment and the proximal fastener, the flexible segment configured to deform to accommodate changes in an angle between the body and the proximal fastener.

Additional examples disclosed herein are directed to a system for ambidextrous hand mounting of an electronic device, the system comprising: a data capture device; and ambidextrous hand mount including: a proximal fastener configured to engage with a wrist of an operator; a distal fastener configured to engage with a finger of the operator; a body connecting the proximal fastener and the distal fastener and configured to extend along a back of a hand of the operator from the wrist to the finger; wherein the body includes: a main segment configured to support the data capture device; and a flexible segment between the main segment and the proximal fastener, the flexible segment configured to deform to accommodate changes in an angle between the body and the proximal fastener.

Further examples disclosed herein are directed to an ambidextrous hand mount for an electronic device, comprising: a proximal fastener configured to engage with a wrist of an operator; a distal fastener configured to engage with a finger of the operator; first and second inputs on opposing sides of the distal fastener, each of the first and second inputs activatable by respective first and second thumbs of the operator to generate a data capture signal; and a body connecting the proximal fastener and the distal fastener and configured to extend along a back of a hand of the operator from the wrist to the finger.

Figure 1:
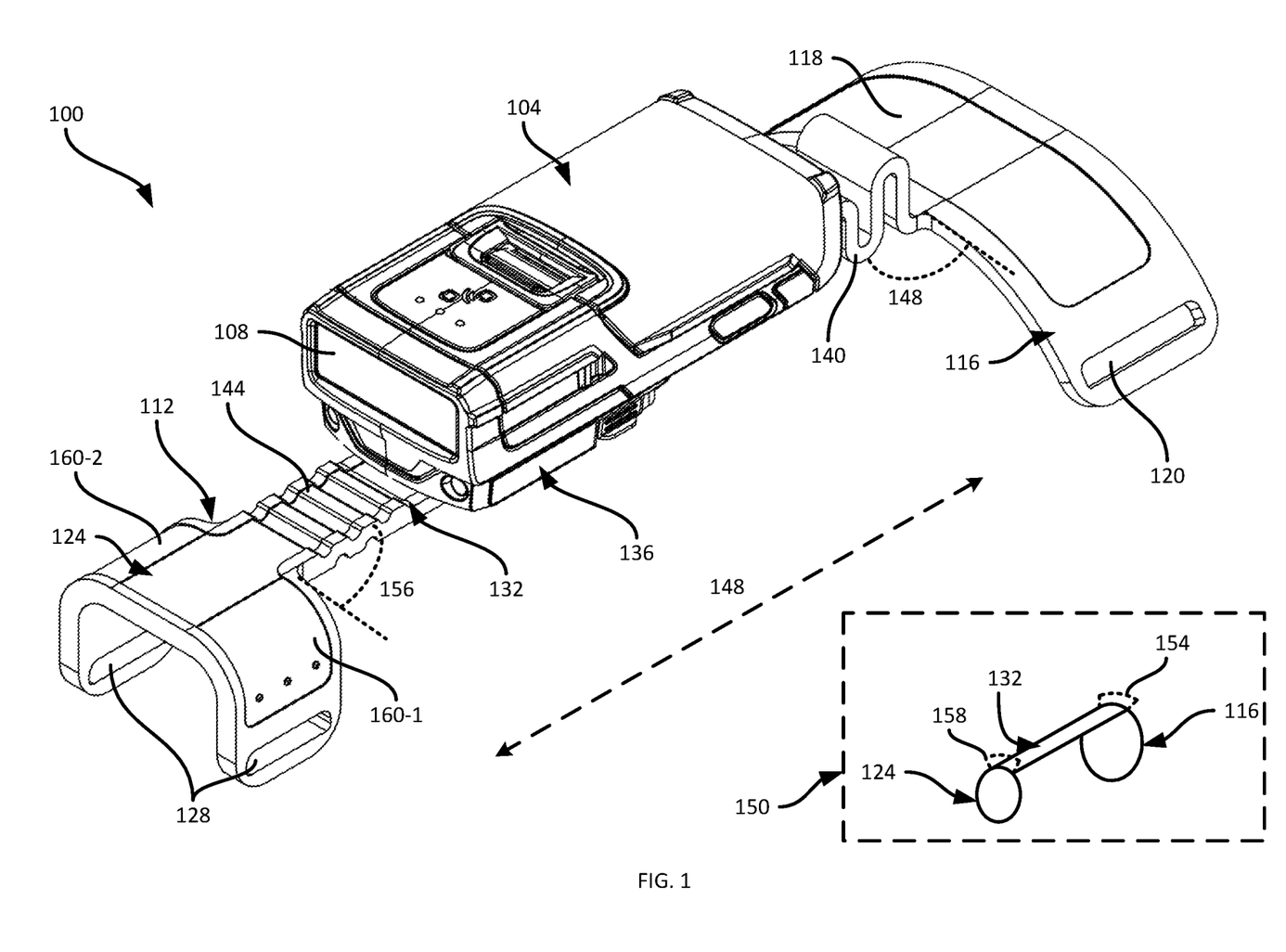
FIG. 1 is an isometric view of a system for ambidextrous hand-mounted operation of an electronic device.

FIG. 1 depicts a system 100 to enable hand-mounted operation of an electronic device, such as a data capture device 104. The data capture device 104, in the present example, is a barcode scanner and therefore includes a data capture assembly (e.g. an image-based barcode scanner including one or more image sensors) enabling the data capture device 104 to capture barcodes via a scan window 108. Other electronic devices can also be employed in the system 100, such as radio frequency identifier (RFID) readers, cameras, range finders, and the like.

The system 100 includes an ambidextrous hand mount 112 (also referred to simply as the mount 112) to removably fasten the data capture device 104 to a back of an operator's hand (i.e. the dorsal side of the hand, opposite the palm). Another mechanism of fastening an electronic device to a hand of an operator integrates a device holder onto a back surface of a glove. However, a single size of glove may not be sufficient to accommodate a wide range of operator hand sizes. Further, a single glove is not suitable for both right-handed and left-handed operation. Still further, gloves place material over the palm of the operator, where such material is prone to excessive wear and may cause discomfort (e.g. due to heat, chafing and the like) to the operator.

The mount 112, as will be discussed in greater detail below, includes various structural features enabling mounting of the data capture device 104 to either left or right hands of various sizes. In addition, as will be apparent in the discussion below, the mount 112 reduces or eliminates the placement of material over the palm of the user.

The mount 112 includes a proximal fastener 116 to engage with a wrist of an operator. The proximal fastener 116 may therefore also be referred to as a wrist band, or a wrist fastener. In the present example, the proximal fastener 116 includes a band that extends partially around the wrist of the operator. The band includes two openings, an opening 120 of which is visible in FIG. 1, to accept an adjustable strap (e.g. having a D-ring or other suitable structure enabling tightening and loosening of the strap, and/or having a flexible material) or the like that surrounds the remainder of the wrist. In the present example, the proximal fastener 116 also includes a recessed surface 118 to accept a label (e.g. a name of the operator or the like). The recessed surface 118 can be omitted in other embodiments.

The mount 112 also includes a distal fastener 124 to engage with at least one finger of the operator. The distal fastener 124 may therefore also be referred to as a finger band or a finger fastener. In the present example, the distal fastener 124 includes a band that extends partially around the finger of the operator. The band also includes two openings 128 to accept an adjustable strap (e.g. having a D-ring or other suitable structure enabling tightening and loosening of the strap, and/or having a flexible material) or the like that surrounds the remainder of the finger. In other examples, the distal fastener 124 can be sized and shaped to accommodate more than one finger (e.g. two fingers or three fingers, although larger distal fasteners 124 are also contemplated).

Between the proximal fastener 116 and the distal fastener 124, the mount 112 includes a body 132. The body 132 extends between the fasteners 116 and 124, and when the mount 112 is worn by an operator, the body 132 therefore extends along the back of the operator's hand from the wrist to the finger(s). As is apparent from FIG. 1, in contrast with a glove, the body 132 does not encircle the hand of the operator. Rather, the body 132 extends from an arc (i.e. a portion of the circumference) of the fastener 116, to an arc of the fastener 124. The simplified view 150 in FIG. 1 illustrates the above distinction. In particular, the body 132 is shown extending between arcs 154 and 158 of the fasteners 116 and 124, which are represented as complete rings (e.g. with the above-mentioned adjustable straps installed).

The body 132, as will be described below, includes structural features to removably secure the data capture device 104 to the mount 112. The system 100 can also, as in the illustrated example, include an adapter 136 to secure the data capture device 104 to the body 132. That is, the body 132 retains the adapter 136, and the adapter 136 retains the data capture device 104. In other examples, the adapter 136 is omitted and the data capture device 104 is coupled directly to the body 132.

Among the features of the body 132 is a main, or central, segment (not visible in FIG. 1) that supports the data capture device 104, and a flexible segment between the main segment and the proximal fastener 116. In the illustrated example, the body 132 includes two flexible segments. In particular, the body 132 includes a proximal flexible segment 140 between the main segment and the proximal fastener 116, and a distal flexible segment 144 between the main segment and the distal fastener 124. The flexible segments 140 and 144 enable the orientation of the main segment to change relative to the fasteners 116 and 124. The flexible segments 140 and 144 therefore also enable the positions of the fasteners 116 and 124 to change relative to each other. For example, the flexible segments 140 and 144 can enable a total length 146 of the body 132 to increase or decrease from that shown in FIG. 1. The flexible segments 140 and 144 can also allow an angle 152 between the fastener 116 and the body 132 to vary, as well as an angle 156 between the fastener 124 and the body 132.

The flexibility of the flexible segments 140 and 144 can be provided in a variety of ways. In the examples shown in the drawings, the mount 112 is fabricated from a single material (e.g. plastic), and the flexible segments 140 and 144 are given greater flexibility than the body 132 by including serpentine or crenellated portions. In other examples, the flexible segments 140 and 144 can be fabricated from different materials than the body 132 (e.g. fabric, a more flexible plastic than the body 132, or the like). That is, the main segment is not necessarily rigid or entirely inflexible. Rather, the flexible segments 140 and 144 are simply more flexible than the main segment. Flexibility may also be provided to the segments 140 and 144 in some embodiments by varying the dimensions of the segments 140 and 144. For example, the segments 140 and 144 may omit the serpentine features shown in FIG. 1, but may have a reduced thickness in comparison to the body 132.

The variation in length and orientation of the body 132 enabled by the flexible segments 140 and 144 enables the mount 112 to deform to accommodate differently-sized or shaped hands, including right hands versus left hands.

The distal fastener 124 can include, as in the illustrated example, an input such as a touch sensor, a button, or the like. The input is activatable, e.g. by a thumb of the operator, to convey a data capture signal or any other suitable input signal to the data capture device 104, as will be discussed in greater detail below. In the present example, the distal fastener 124 includes inputs 160-1 and 160-2 on both sides thereof, to enable ambidextrous initiation of a data capture operation or other suitable operation by the data capture device 104. In other examples, a single input 160 extending from one side of the distal fastener 124 to the other side can be provided.

Figure 2:
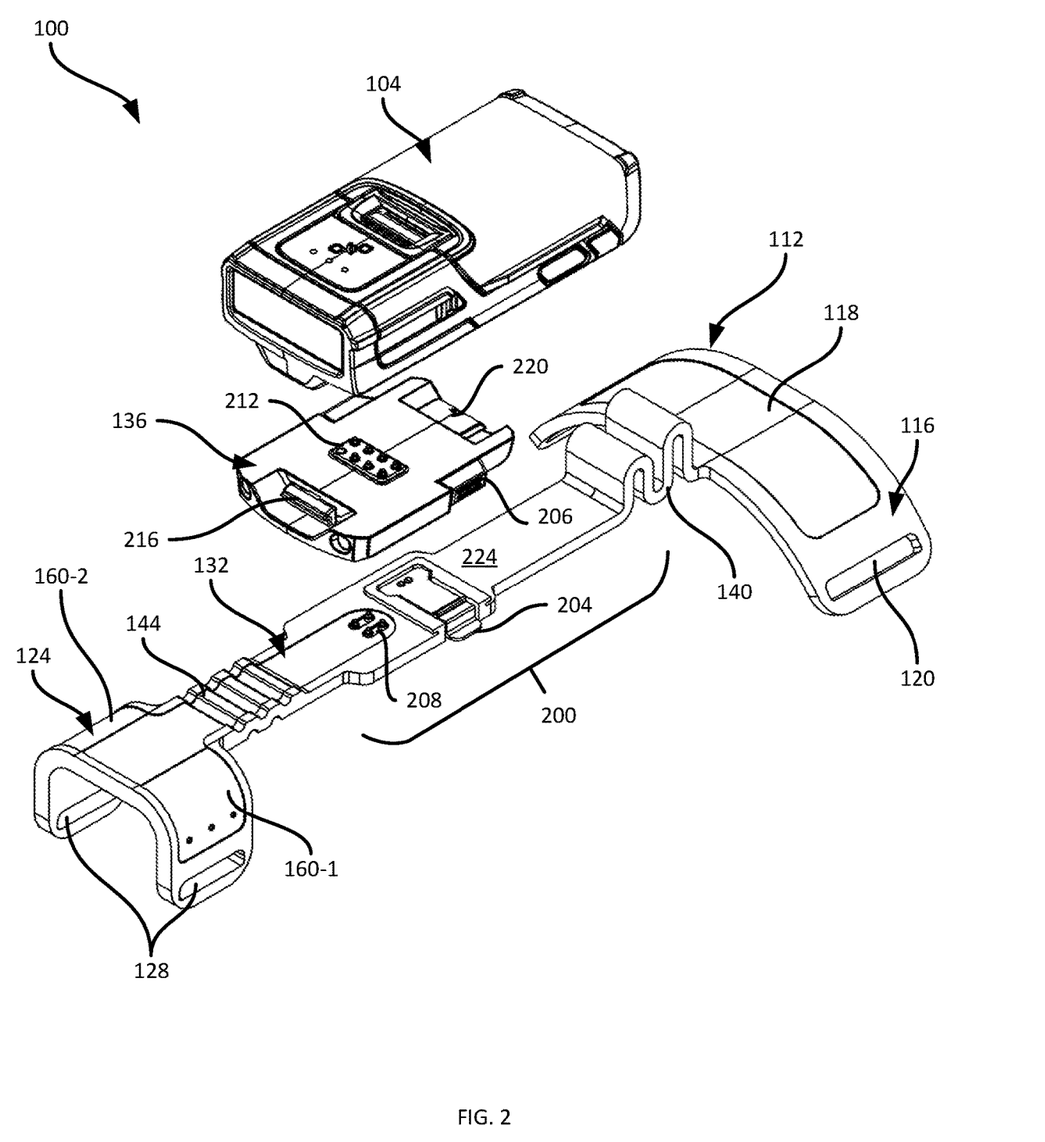
FIG. 2 is an exploded isometric view, taken from above, of the system of FIG. 1.
Figure 3:
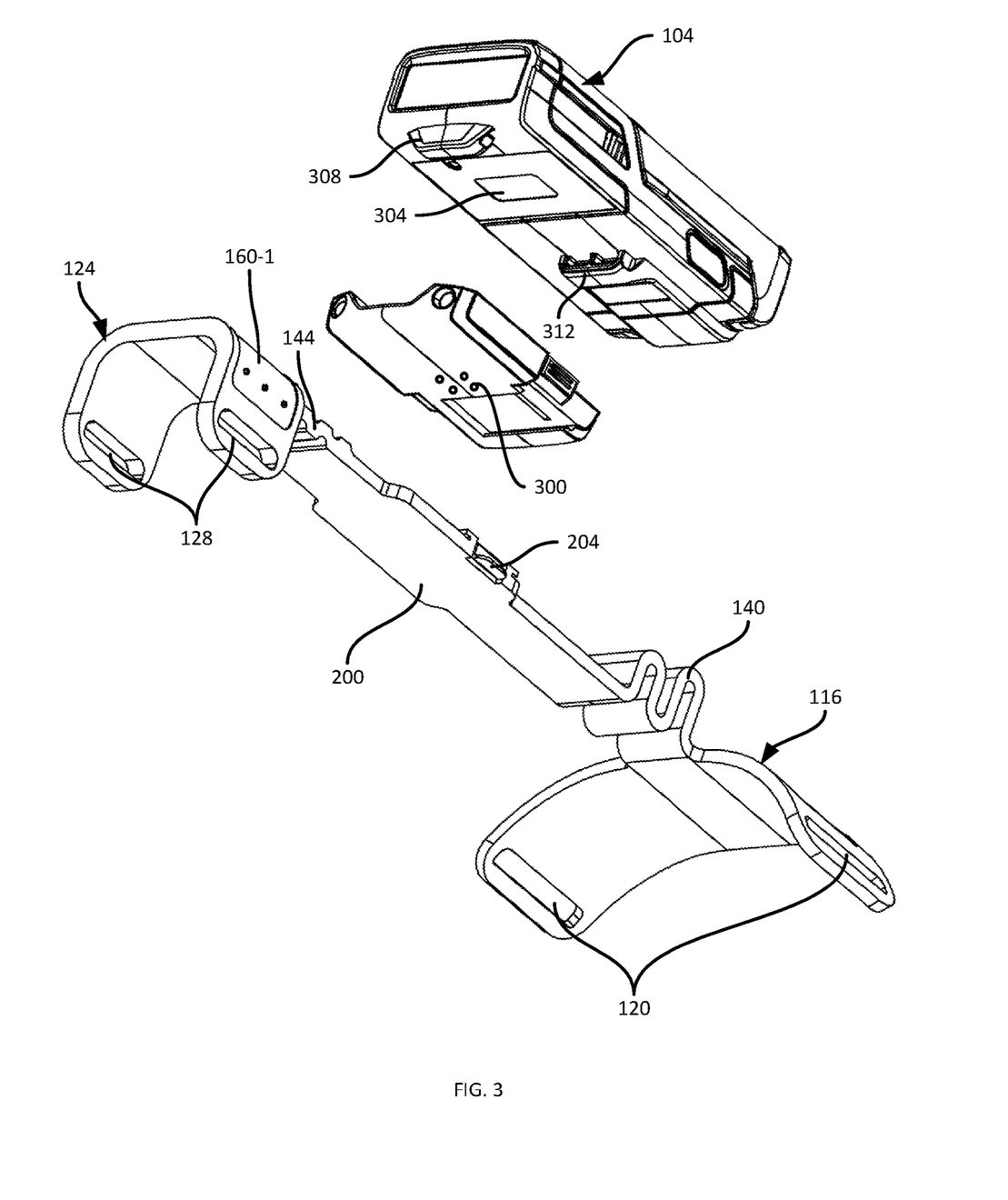
FIG. 3 is an exploded isometric view, taken from below, of the system of FIG. 1.

Turning to FIGS. 2 and 3, exploded views of the system 100 from above and below are shown, illustrating certain additional features of the mount 112. In particular, with the adapter 136 and the data capture device 104 removed from the mount 112, a main segment 200 of the body 132 is visible between the flexible segments 140 and 144.

The main segment 200 includes a latch assembly 204, such as a spring-biased latch. The latch assembly 204 engages with the adapter 136 (e.g. with a portion 206 of the adapter 136) to releasably secure the adapter 136 to the main segment 200. The main segment 200 also includes a set of electrical contacts 208. The electrical contacts 208 are electrically connected with the inputs 160 (e.g. via conductive material embedded in the fastener 124, the flexible segment 144 and the main segment 200). The electrical contacts 208 engage with a set of lower contacts 300 of the adapter 136 (shown in FIG. 3). The lower contacts 300, in turn, are electrically connected via a housing of the adapter 136 with a set of upper contacts 212 of the adapter 136. The upper contacts 212 engage with a further set of contacts 304 (see FIG. 3) of the data capture device 104. Thus, the contacts 212 and 300 of the adapter serve to electrically connect the inputs 160 (via the contacts 208) to the contacts 304 of the data capture device 104, to convey input signals from the inputs 160 to the data capture device 104.

The adapter 136 includes latches 216 and 220 that removably engage hooks 308 and 312, respectively, on a lower side of the data capture device 104. The latch 216 may be spring-loaded to enable placement and removal of the data capture device 104 onto the adapter 136. In other examples, the adapter 136 is omitted, and the latches 216 are provided on an upper surface 224 of the main segment 200 instead of the latch assembly 204. In further examples, the hooks 308 and 312 are omitted from the data capture device 104, and the data capture device 104 instead includes a structure analogous to the portion 206 of the adapter 136 that engages with the latch assembly 204 of the main segment 200.

Figure 4:
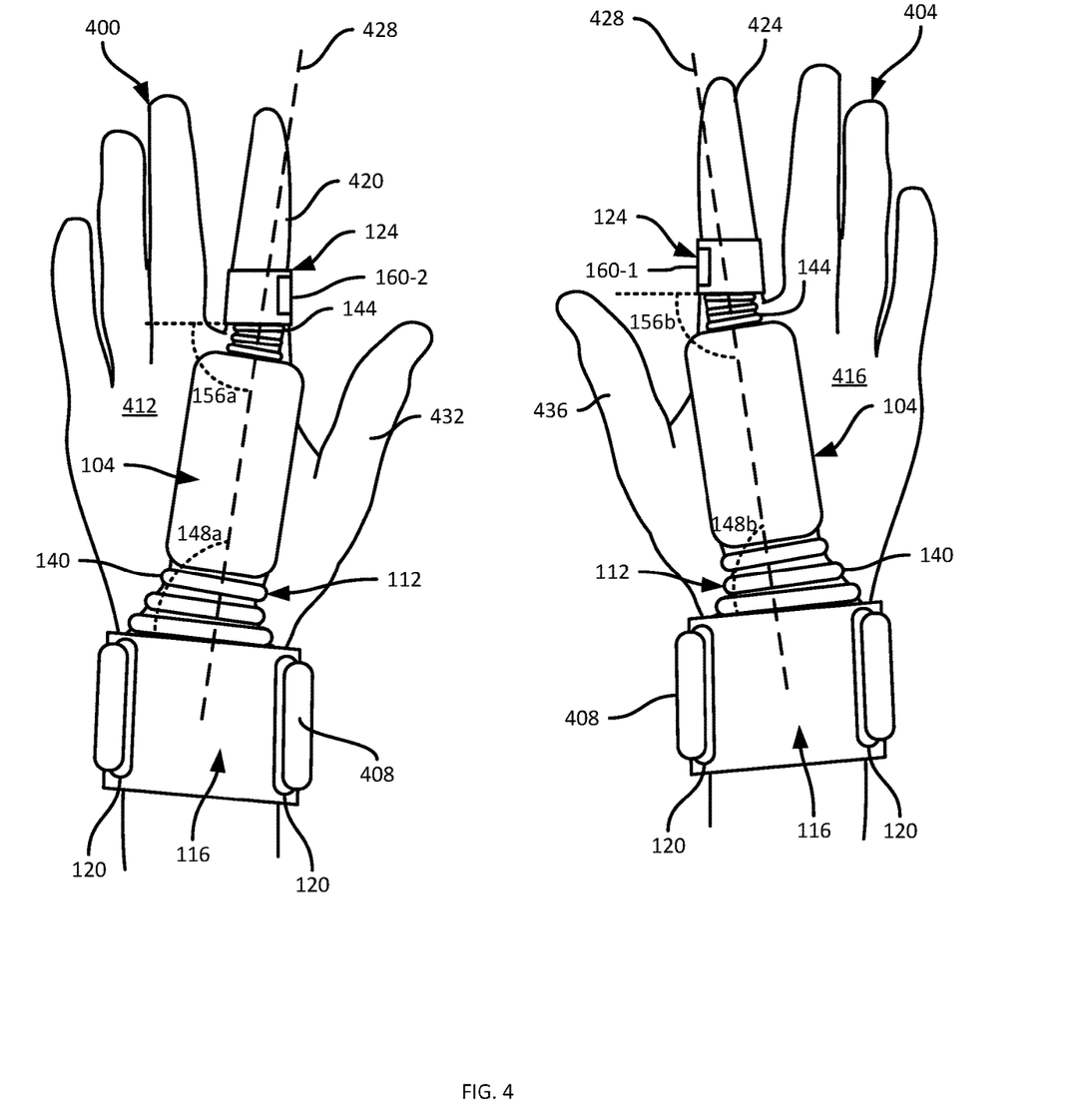
FIG. 4 is a diagram illustrating the system of FIG. 1 in each of a left-handed configuration and a right-handed configuration.

Turning to FIG. 4, the system 100 is shown mounted on a left hand 400, as well as a right hand 404, of an operator. The proximal fastener 116 is shown with an adjustable strap 408 extending between the openings 120 to form a loop to encircle a wrist of the operator. The data capture device 104, supported by the body 132 of the mount 112, lies along a back 412 of the left hand 400, or a back 416 of the right hand 404. The distal fastener 124 is coupled to the left index finger 420 or the right index finger 424. As seen in FIG. 4, the flexible segments 140 and 144 enable the angles 148 and 156 to vary depending on which hand the mount 112 is worn on. The angle 148a for left-handed operation is greater than the angle 148b for right-handed operation, and the angle 156a for left-handed operation is smaller than the angle 156b for right-handed operation. The changes in angle between the body 132 (and therefore the data capture device 104) and the fasteners 116 and 124, therefore, enable reconfiguration of the mount 112 to accommodate either hand 400 or 404.

As a result of the angular adjustment enabled by the mount 112, a longitudinal axis 428 of the data capture device 104 (e.g. the center of a field of view of the scan window 108) remains substantially aligned with the index fingers 420 or 424. The data capture device 104 can therefore be aimed with the index fingers 420 or 424. Operation of the inputs 160, as seen in FIG. 4, is performed by the left or right thumb 432 or 436. In particular, the left thumb 432 can be used to activate the input 160-2, while the right thumb 436 can be used to activate the input 160-1.

Figure 5:
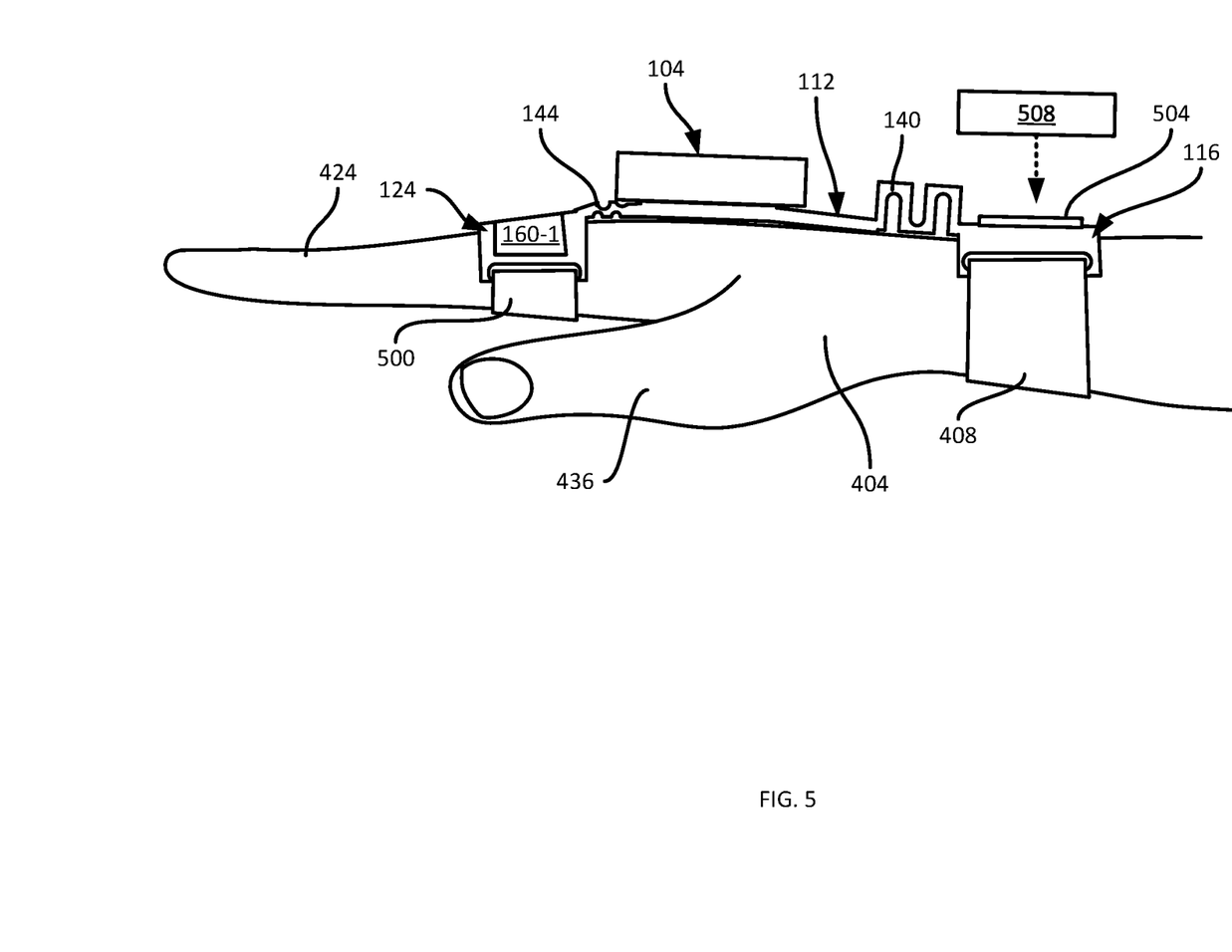
FIG. 5 is a diagram illustrating a side view of the system of FIG. 1 in a right-handed configuration.

FIG. 5 illustrates a side view of the mount 112 worn on the right hand 404. FIG. 5 illustrates an adjustable strap 500 on the distal fastener 124, as mentioned earlier. In other examples, the distal fastener 124 and the strap 500 can be implemented as a single component, e.g. a strap of rubber or other suitable flexible material connected with the body 132. The input(s) 160 are embedded in the flexible material. In further examples, the proximal fastener 116 and the strap 408 can also be implemented as a single component, e.g. a strap of rubber or other suitable flexible material. In addition, FIG. 5 illustrates certain additional features of the mount 112. For example, the mount 112, in some embodiments, can include a computing device support 504 on the proximal fastener, for example to carry a mobile computing device 508 such as a wrist-mounted computer configured to communicate with the data capture device 104 (e.g. to receive barcode data captured by the device 104).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An ambidextrous hand mount for an electronic device, comprising:
   a proximal fastener configured to engage with a wrist of an operator;

a distal fastener configured to engage with a finger of the operator;

a body connecting the proximal fastener and the distal fastener and configured to extend along a back of a hand of the operator from the wrist to the finger; wherein the body includes:

a main segment configured to support the electronic device;

a first flexible segment disposed between the main segment and the proximal fastener, the first flexible segment configured to deform to accommodate changes in an angle between the body and the proximal fastener;

a second flexible segment between the main segment and the distal fastener, the second flexible segment configured to deform to accommodate changes in an angle between the body and the distal fastener; and a set of electrical contacts disposed on the main segment of the body between the proximal fastener and the distal fastener, the set of electrical contacts configured to receive a signal for transmission to the device contacts of the electronic device.

2. The ambidextrous hand mount of claim 1, wherein the body is connected to an arc of the proximal fastener.

3. The ambidextrous hand mount of claim 1, wherein the body is connected to an arc of the distal fastener.

4. The ambidextrous hand mount of claim 1, wherein the distal fastener is configured to engage with a plurality of fingers of the operator.

5. The ambidextrous hand mount of claim 1, wherein the proximal fastener includes an adjustable strap.

6. The ambidextrous hand mount of claim 1, wherein the distal fastener includes an adjustable strap.

7. The ambidextrous hand mount of claim 1, further comprising:

a first input on the distal fastener, wherein activation of the input by a thumb of the operator causes the input to generate a data capture signal, wherein the set of electrical contacts disposed on the main segment of the body is configured to receive the data capture signal for transmission to the electronic device.

8. The ambidextrous hand mount of claim 7, wherein the first input is disposed on a first side of the distal fastener, the mount further comprising:

a second input on a second side of the distal fastener for activation by an opposing thumb of the operator.

9. The ambidextrous hand mount of claim 7, wherein the first input extends from a first side of the distal fastener to a second side of the distal fastener.

10. The ambidextrous hand mount of claim 7, wherein the input includes at least one of a touch sensor and a button.

11. The ambidextrous hand mount of claim 1, wherein the first and second flexible segments include a serpentine portion.

12. The ambidextrous hand mount of claim 1, wherein the main segment includes a first material, and wherein the first and second flexible segments include a second material.

13. The ambidextrous hand mount of claim 1, further comprising:

a latch assembly on the main segment, configured to releasably couple the electronic device to the main segment.

14. The ambidextrous hand mount of claim 13, wherein the latch assembly is configured to releasably secure an adapter coupled to the electronic device.

15. The ambidextrous hand mount of claim 1, wherein the body is configured to align a longitudinal axis of the electronic device with the finger.

16. A system for ambidextrous hand mounting of an electronic device, the system comprising:

a data capture device;

ambidextrous hand mount including:

a proximal fastener configured to engage with a wrist of an operator;

a distal fastener configured to engage with a finger of the operator;

a body connecting the proximal fastener and the distal fastener and configured to extend along a back of a hand of the operator from the wrist to the finger; wherein the body includes:

a main segment configured to support the data capture device;

at least one flexible segment disposed between one of (a) the main segment and the proximal fastener and (b) the main segment and the distal fastener, the at least one flexible segment configured to deform to accommodate changes in a corresponding angle between one of (a) the body and the proximal fastener, and (b) the body and the distal fastener; and a set of electrical contacts disposed on the main segment of the body, the set of electrical contacts configured to receive a signal for transmission to the data capture device; and an adapter configured to engage the main segment of the body, the adapter including a set of lower contacts configured to engage with the set of electrical contacts on the main segment of the body and a set of upper contacts connected with the set of lower contacts and configured to engage with device contacts of the data capture device.

17. The system of claim 16, wherein the adapter includes a latch for releasably coupling to the data capture device.

18. The system of claim 17, the distal fastener including an input, wherein activation of the input by a thumb of the operator causes the input to generate a data capture signal.

19. The system of claim 16 further comprising a first input is disposed on a first side of the distal fastener and a second input disposed on a second side of the distal fastener for activation by an opposing thumb of the operator.

20. The system of claim 16, wherein the body includes:

a first flexible segment disposed between the main segment and the proximal fastener; and a second flexible segment between the main segment and the distal fastener.

21. An ambidextrous hand mount for an electronic device, comprising:

a proximal fastener configured to engage with a wrist of an operator;

a distal fastener configured to engage with a finger of the operator, the distal fastener including first and second inputs on opposing sides of the distal fastener, each of the first and second inputs configured to be activated by respective first and second thumbs of the operator to generate a data capture signal; and a body connecting the proximal fastener and the distal fastener and configured to extend along a back of a hand of the operator from the wrist to the finger, wherein the body includes:

a main segment configured to support the electronic device at least one flexible segment disposed between one of
(a) the main segment and the proximal fastener and
(b) the main segment and the distal fastener, the at least one flexible segment configured to deform to accommodate changes in a corresponding angle between one of (a) the body and the proximal fastener, and (b) the body and the distal fastener.

22. The ambidextrous hand mount of claim 21, wherein the body is connected to an arc of the proximal fastener and wherein the body is connected to an arc of the distal fastener.

23. The ambidextrous hand mount of claim 21, wherein the body includes:
  a first flexible segment disposed between the main segment and the proximal fastener; and
  a second flexible segment between the main segment and the distal fastener.

* * * * *